United States Patent
Bowles

(10) Patent No.: US 11,349,284 B2
(45) Date of Patent: May 31, 2022

(54) BATTERY POWERED FISH TAPE

(71) Applicant: Ridge Tool Company, Elyria, OH (US)

(72) Inventor: Richard R. Bowles, Solon, OH (US)

(73) Assignee: Ridge Tool Company, Elyria, OH (US)

( * ) Notice: Subject to any disclaimer, the term of this patent is extended or adjusted under 35 U.S.C. 154(b) by 81 days.

(21) Appl. No.: 16/661,693

(22) Filed: Oct. 23, 2019

(65) Prior Publication Data

US 2021/0126438 A1   Apr. 29, 2021

(51) Int. Cl.
*H02G 1/00* (2006.01)
*H02G 1/08* (2006.01)

(52) U.S. Cl.
CPC .................................. *H02G 1/083* (2013.01)

(58) Field of Classification Search
CPC  B65H 75/305; B65H 75/406; B65H 75/4428; B65H 75/4486; B65H 75/28; B65H 2701/376; H02G 1/083
See application file for complete search history.

(56) References Cited

U.S. PATENT DOCUMENTS

| | | | | |
|---|---|---|---|---|
| 4,004,780 A * | 1/1977 | Kuzarov | .................. | B66D 1/16 254/345 |
| 4,917,362 A | 4/1990 | Wilson | | |
| 6,722,603 B1 * | 4/2004 | Atencio | ............... | B65H 75/406 242/390.8 |
| 8,496,229 B1 | 7/2013 | Mayhall | | |
| 2015/0122350 A1 * | 5/2015 | Morgan | ............... | B65H 75/446 137/355.26 |
| 2019/0292005 A1 | 9/2019 | Miller et al. | | |

FOREIGN PATENT DOCUMENTS

WO    WO 2006122129    11/2006

OTHER PUBLICATIONS

International Search Report and Written Opinion dated Feb. 3, 2021; Application No. PCT/US20/56757; 15 pages.
Acme Tools citing M18 Fuel Angler Pulling Fish Tape from Milwaukee Tool; https://www.acmetools.com/blog/milwaukee-nps-2019-product-highlights/ ; 83 pages.
Pikdo, Rocky Mountain Sparky citing Milwaukee Tool #NPS2019 Fish Tape; https://pikdo.net/p/rockymtnsparky/2064298349183543133_13857927415; 6 pages.
YouTube video; https://www.youtube.com/watch?v=IOXtUVr5R7Q; 3 pages.
http://www.uniquetechnologies-usa.com/cordless-fishtape.html; 1 page.

* cited by examiner

*Primary Examiner* — Lee D Wilson
(74) *Attorney, Agent, or Firm* — Mark E. Bandy; Rankin, Hill & Clark LLP

(57) ABSTRACT

A powered fish tape having a rotatable drum is described for pulling electrical wires through conduit or other enclosed regions. The fish tape utilizes an electric motor and a gear assembly for extending or retracting the fish tape and wires attached thereto. The fish tape includes a powered mode and a manual mode. When placed in the manual mode, an operator may manually rotate the drum to extend or retract the fish tape.

21 Claims, 8 Drawing Sheets

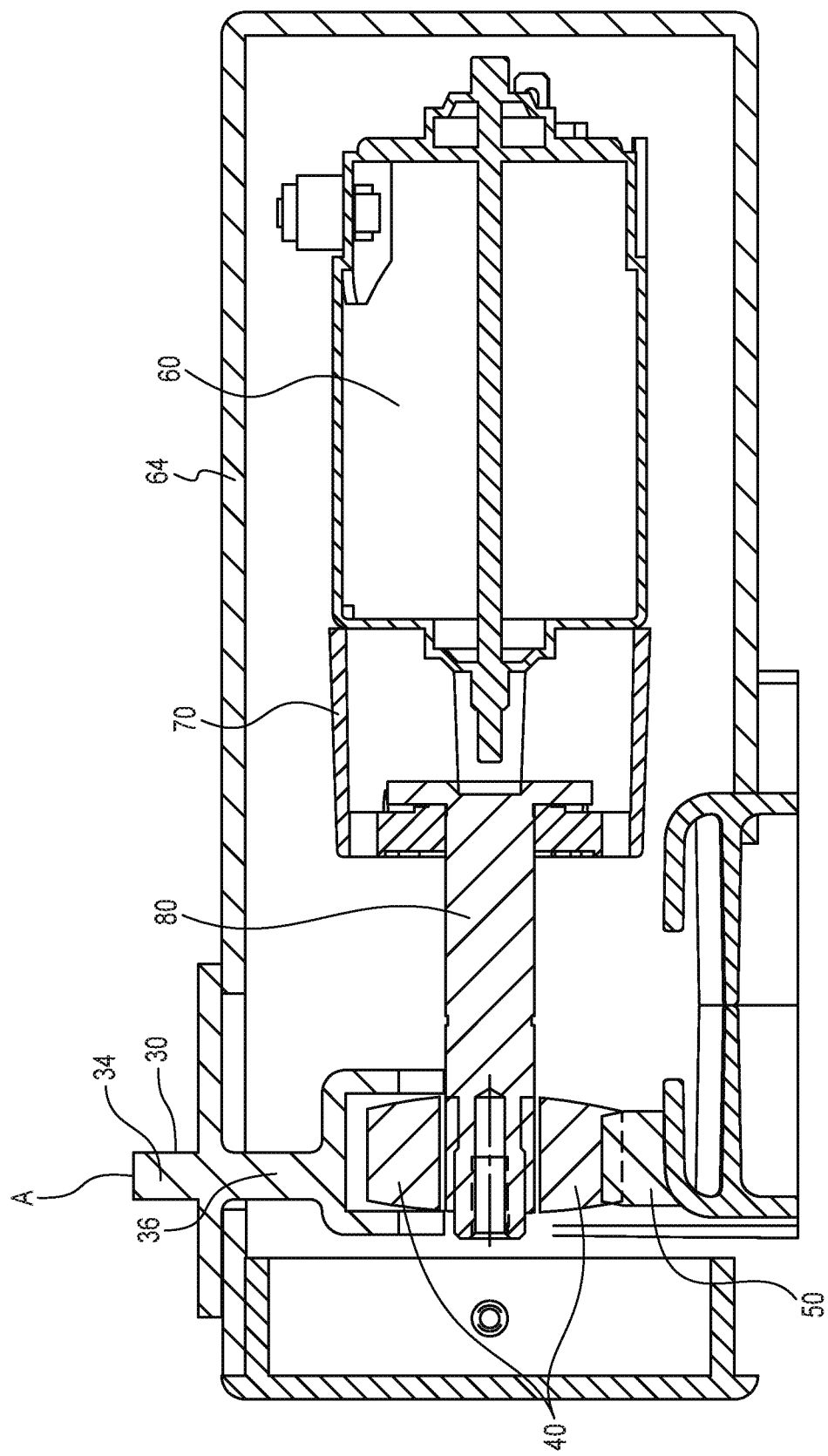

BATTERY POWERED FISH TAPE

FIELD

The present subject matter relates to a tool commonly referred to as a "fish tape." This tool is used by electrical contractors when running electrical wires in conduits.

BACKGROUND

Fish tapes have been known for many years and a variety of such products are available from tool suppliers including Greenlee Tool Company, Klein Tools, and Southwire Tools. Numerous lower quality brands are also available in the market. All known products share many similar features and typically rely on manual operation to extend and retract the fish tape from a drum style housing.

A primary function of a fish tape is to pull electrical conductor wires through conduits or hollow spaces such as the interior of walls. The basic operating principle of such tool relies on manually extending a relatively stiff wire and rotating a housing drum with respect to a handle. Fish tapes feed out in a similar manner as a tape measure. The relatively stiff fish tape wire can be extended into a proposed route for wiring such as hollow electrical conduit. Often an assistant will be at the other end of the conduit and when the end of the fish tape wire is exposed, the assistant will attach conductor wires to be pulled through the conduit. The operator then manually pulls or retracts the fish tape which drags the conductors into and through the hollow conduit. While the fish tape is being retracted, the user must manually pull on the fish tape wire and at the same time rotate the drum housing to coil the fish tape wire back up into the drum. This is a tedious process. Some fish tapes extend as far as 200 feet. Accordingly, pulling or tape retraction requires a significant amount of manual effort and attention.

SUMMARY

In one aspect, the present subject matter provides a fish tape tool comprising a housing having a handle including a battery receptacle configured for receiving at least one battery. The tool also comprises a rotatable drum. The drum defines a hollow interior region and an aperture providing access to the interior region of the drum. The tool also comprises an electric motor disposed in the housing. The electric motor provides a rotatably powered output shaft. The tool additionally comprises a drive assembly configured to transfer rotary power from the output shaft of the electric motor to the rotatable drum. And, the tool comprises a drive selector positionable between (i) a powered mode in which rotation of the output shaft of the electric motor results in rotation of the drum, and (ii) a manual mode in which rotation of the output shaft of the electric motor is independent from rotation of the drum.

In another aspect, the present subject matter provides a fish tape tool comprising a handle and a drum defining a hollow interior region. The drum is supported by the handle and defines a central axis and the drum rotatable about the central axis. The tool also comprises a ring gear affixed to the drum. The tool also comprises an electric motor supported by the handle. The electric motor provides a rotatable drive. The tool additionally comprises a pinion gear assembly rotatably powered by the drive of the electric motor. The pinion gear is axially positionable between a first position in which the pinion gear is engaged with the ring gear, and a second position in which the pinion gear is disengaged from the ring gear.

In still another aspect, the present subject matter provides a method for pulling a flexible member through an enclosed region. The method comprises providing a fish tape tool including (i) a handle, (ii) a drum defining a hollow interior region, the drum supported by the handle and defining a central axis and the drum rotatable about the central axis, (iii) a ring gear affixed to the drum, (iv) an electric motor supported by the handle, the electric motor providing a rotatable drive, and (v) a pinion gear assembly rotatably powered by the drive of the electric motor, the pinion gear axially positionable between a first position in which the pinion gear is engaged with the ring gear, and a second position in which the pinion gear is disengaged from the ring gear. The method also comprises extending the fish tape wire through the enclosed region. The method further comprises attaching the flexible member to a distal end of the fish tape wire. And, the method comprises retracting the fish tape wire through the enclosed region thereby pulling the flexible member through the enclosed region.

The difficulties and drawbacks associated with previous approaches are addressed in the present subject matter as follows.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIGS. 6A and 6B are partial sectional views taken along line VI-VI in FIG. 2 showing engagement and disengagement positions.

DETAILED DESCRIPTION OF THE EMBODIMENTS

The present subject matter fish tapes utilize a similar configuration to known manual fish tapes prevalent in the electrical construction industry. However, the embodiments of the present subject matter fish tapes also utilize a motor and a drive assembly configured to transfer rotary power from the motor to a rotatable drum. In many of the embodiments, the drive assembly includes a gear box incorporated into a handle or housing, and a ring gear positioned along an outer diameter of a rotatable drum. In certain embodiments, the handle also contains a battery receptacle or "shoe" for commercially available Li-Ion batteries such as an 18 volt Li-Ion battery available from Ridge Tool under the RIDGID designation. Alternatively, the device could be configured to accept a 12 volt Li-Ion battery commercially available from various suppliers for reduced power and run time. Typically, the handle includes a trigger and switch arrangement to regulate operation of the motor. A variety of electric motors could be used including but not limited to a permanent magnet DC type or a brushless DC type. If a brushless DC motor is used, an electronic circuit board for governing motor commutation can be utilized and incorporated in the handle or housing of the tool.

Generally, FIGS. 1-6 show an embodiment of a fish tape in accordance with the present subject matter. A handle and/or housing component includes a slide action switch that causes a drive pinion to move axially along a keyed shaft. This allows the drive pinion to be engaged or disengaged from a ring gear that is affixed to a rotatable drum. In the engaged position, when the motor is turned on, the drive pinion rotates. The fish tape can also include a set of gears in a planetary gear box. Typically, the set of gears is disposed between the motor output shaft and the pinion gear. A final output shaft of the gears rotates the drive pinion. If the drive pinion and ring gear are in an engaged position, the rotation of the drive gear causes the ring gear to rotate with respect to a stationary handle. The rotation of the ring gear causes rotation of the drum which consequentially retracts (or advances) the fish tape wire into the drum and causes the fish tape wire to coil in an orderly manner. In many versions, motor rotation can be changed to cause rotation of the drum in an opposite direction to thereby advance or dispense the fish tape wire out of the drum. The trigger switch can be of a style that allows variable speed operation of the motor for maximum control. The slide action switch typically located in the handle allows disengagement of the drive pinion from the ring gear to allow free rotation of the drum manually to use the fish tape in a conventional manner for such tools.

Figure 1:
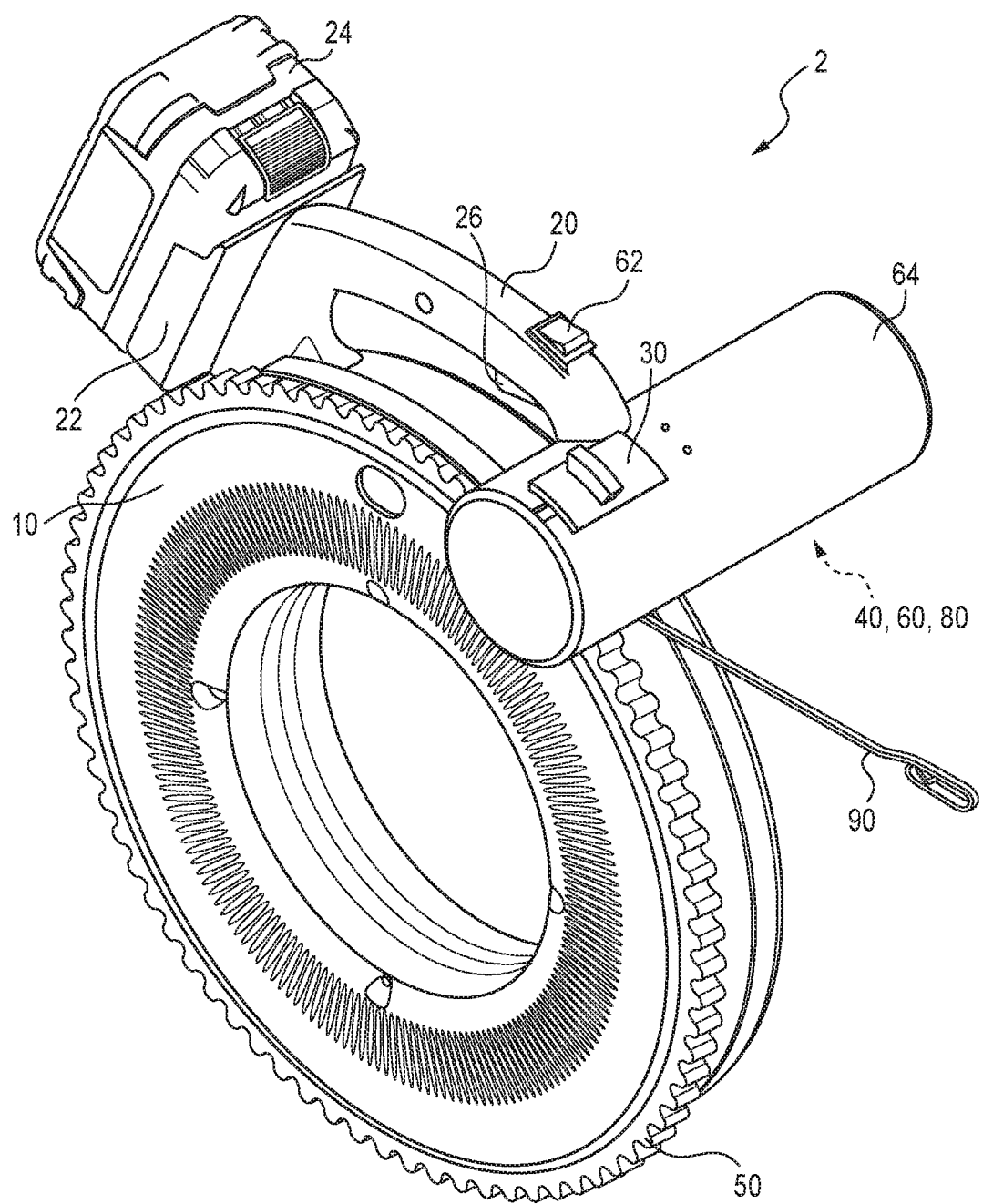
FIG. 1 is a perspective view of an embodiment of a fish tape in accordance with the present subject matter.
Figure 2:
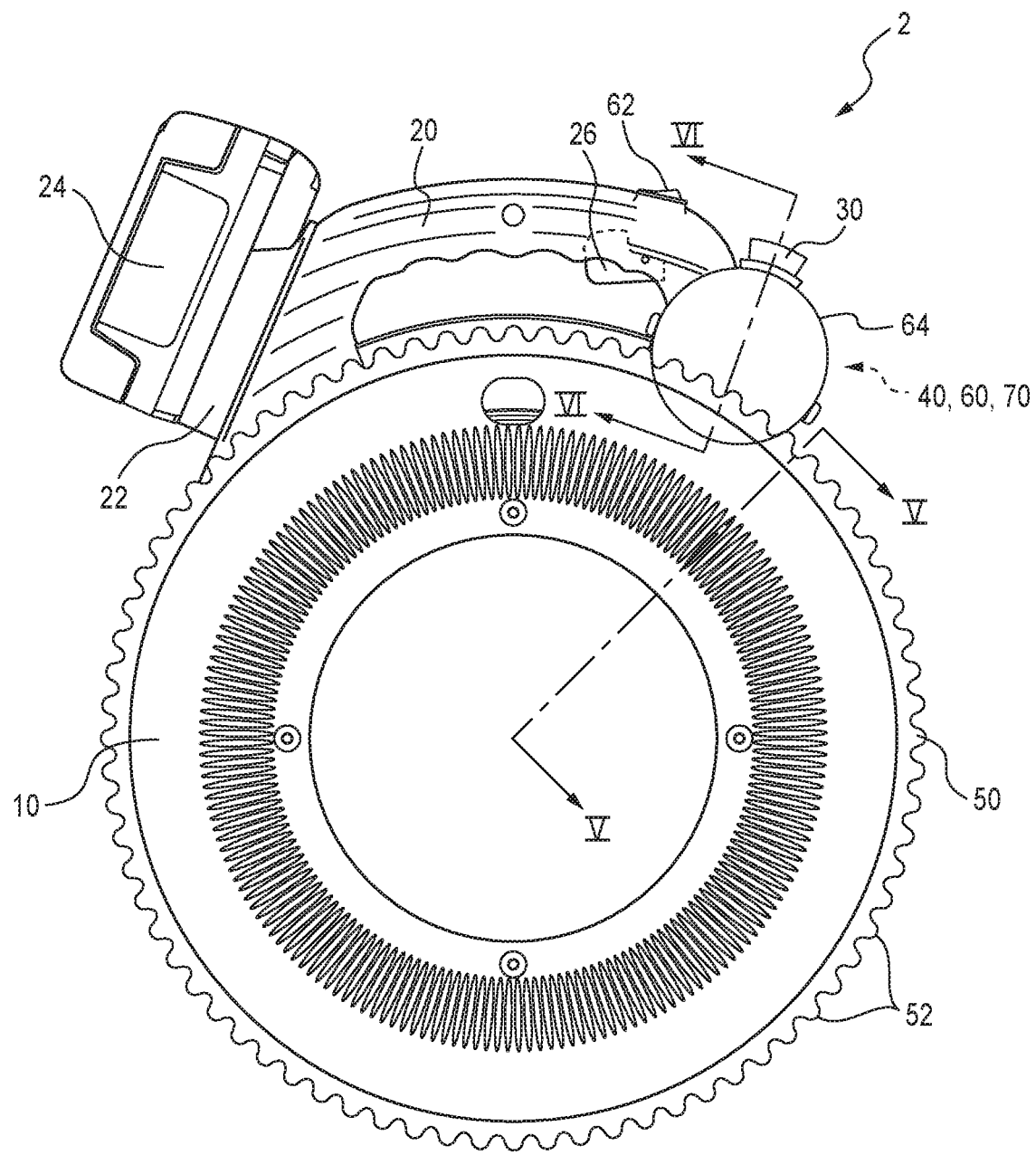
FIG. 2 is a schematic side elevational view of the fish tape of FIG. 1.

Specifically, FIGS. 1 and 2 illustrate an embodiment of a fish tape 2 in accordance with the present subject matter. The fish tape 2 comprises a handle 20, a drum 10 rotatable relative to the handle, and a motor and gear assembly disposed within a housing 64. Typically, the handle 20 is integral or otherwise affixed to the housing 64. The fish tape 2 also comprises a ring gear 50 affixed or otherwise secured to the drum 10 which is engageable with a drive pinion 40 which in certain versions is at least partially disposed in the housing 64. It will be understood that alternate assemblies and configurations could be used such as for example a friction drive wheel. The drive pinion 40 is typically in the form of a gear having a plurality of gear teeth. The drive pinion 40 is rotatably powered by a motor 60, a gear assembly 70, and an output shaft 80 disposed in the housing 64. As noted, the handle 20 may include a battery receptacle or shoe 22 and one or more batteries 24 engaged therein. The drum 10 defines a generally hollow interior within which resides the fish tape wire 90.

The fish tape 2 typically also comprises various controls. A slide action switch or drive selector 30 is movably mounted or otherwise provided along the housing 64 or the handle 20 to enable an operator to selectively position the drive pinion 40 relative to the ring gear 50. As described in greater detail herein, the slide action switch 30 enables an operator to select between a powered mode or a manual mode of operation. The fish tape 2 also comprises an actuation switch 26 for governing on/off operation of the motor 60. In certain versions, the actuation switch 26 can also govern operational speed, i.e., rotational speed, of the motor 60. The actuation switch 26 can be in the form of a variable position trigger switch. Although typically located along the handle 20, the actuation switch can be located at other placement(s) such as on the housing 64. The fish tape 2 may also comprise a direction switch 62 enabling an operator to select a direction of rotation of the motor 60. As will be understood, this enables selective retraction or advancement of the fish tape wire 90 relative to the drum 10. Similarly, the direction switch 62 could be located elsewhere, for example on the housing 64. It is also envisioned that actuation switch 26 could be a dual action type of motion switch, allowing for forward or reverse rotation of the motor by a user moving the switch from neutral (off) to a first position (forward) or a second position (reverse) in a single trigger.

Figure 3:
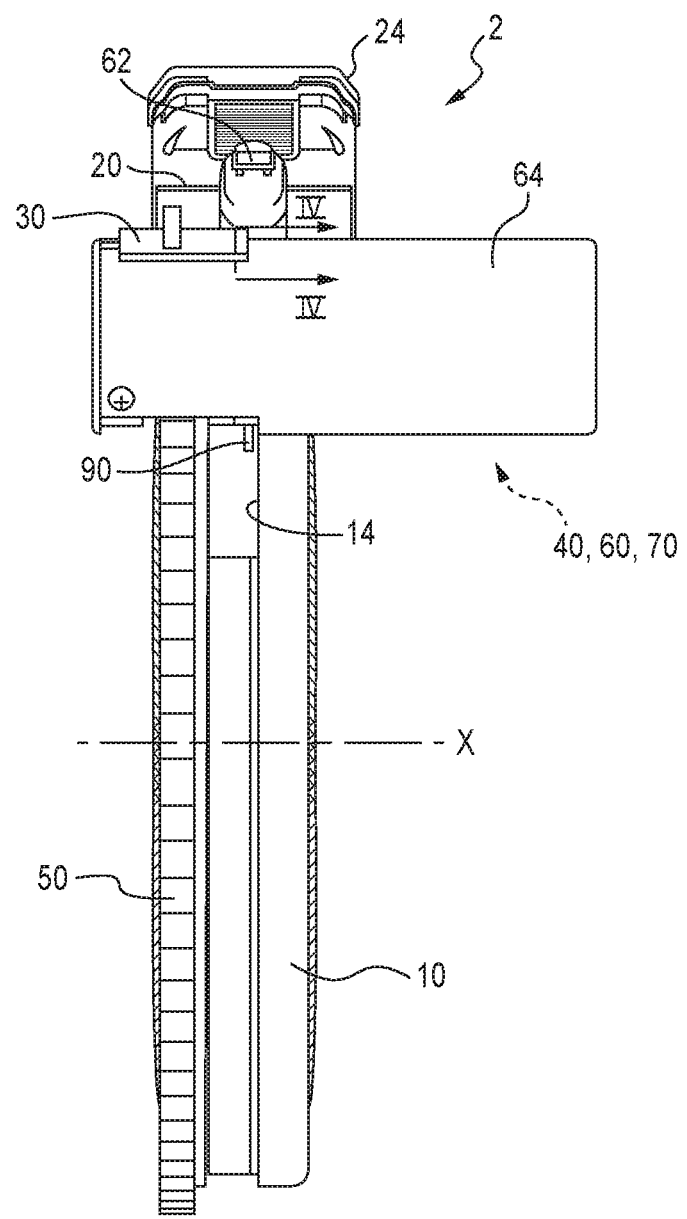
FIG. 3 is a schematic end view of the fish tape of FIG. 1.

FIG. 3 further illustrates the fish tape 2. The drum 10 is rotatable about a center axis X. The drum 10 is typically rotatably supported by one or both of the handle 20 and/or the housing 64. The drum 10 defines a generally hollow interior within which is disposed the fish tape wire 90. The drum 10 defines an aperture 14 for providing access to the hollow interior of the drum. The fish tape wire 90 typically extends through the aperture 14.

Figure 4:
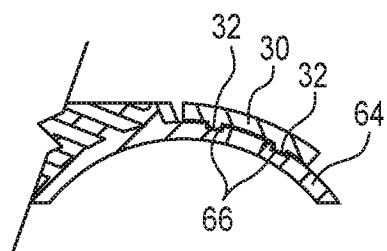
FIG. 4 is partial sectional view taken along line IV-IV in FIG. 3.

FIGS. 3 and 4 illustrate additional aspects of the slide action switch 30. Typically, the slide switch 30 is selectively movable or positionable along the housing 64. In many versions, the slide action switch 30 is movable in a direction generally parallel with the axis X. However, it will be understood that the present subject matter is not limited to such a switch configuration and includes a wide array of other arrangements. In a particular version, the slide action switch 30 can include one or more extending rail(s) 32 which are slidably received in corresponding recesses 66 defined in the housing 64. In an alternative arrangement, selection switch 30 could be an electric solenoid actuated switch configured where energizing the motor by depressing trigger 26 could energize the solenoid and cause switch 30 to move to a position A. A spring clip (not shown) would return the switch and pinion 40 to position B, disengaged when the motor is not energized.

Figure 5:
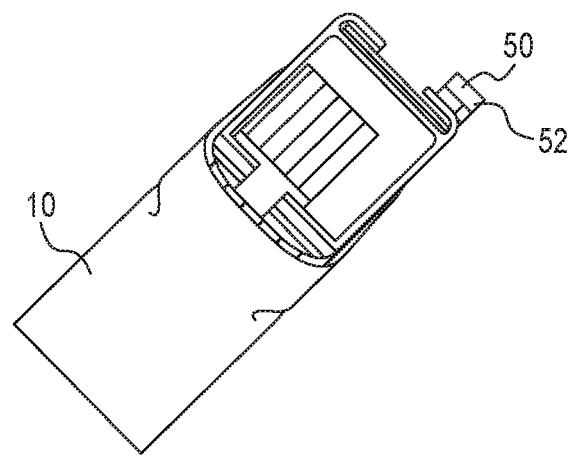
FIG. 5 is a partial sectional view taken along line V-V in FIG. 2.

FIG. 5 is a partial cross section of the drum 10. The ring gear 50 is typically affixed or otherwise secured to the drum 10 and configured so that gear teeth 52 of the ring gear 50 extend radially outward from the drum 10. The gear teeth 52 of the ring gear 50 are configured to engage corresponding gear teeth of the drive pinion 40 upon selection of the powered mode using the switch 30. The present subject matter also includes versions in which teeth of the ring gear project radially inward or laterally outward relative to the axis X of the drum.

Figure 6B:
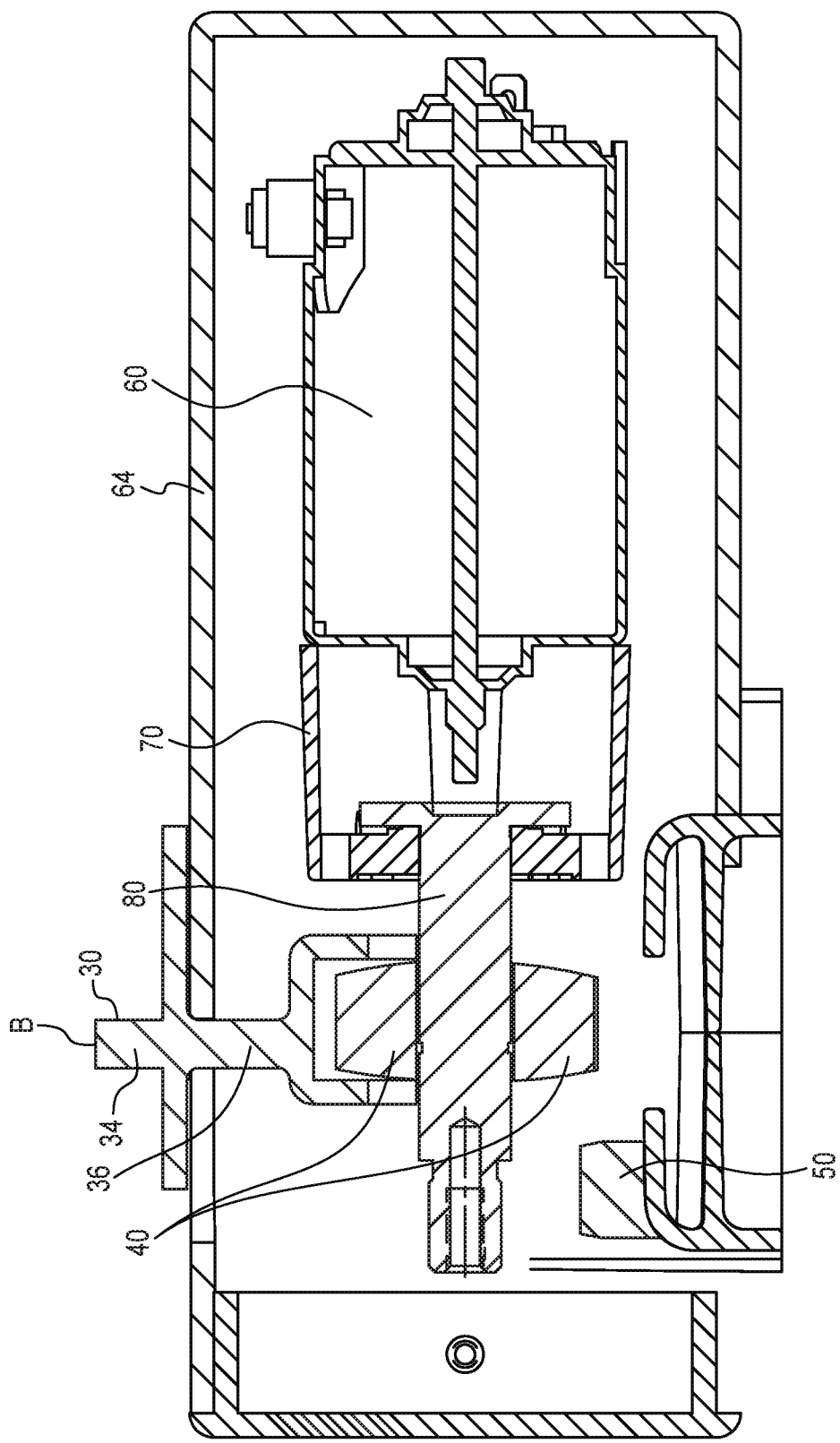

FIGS. 6A and 6B illustrate additional aspects of the drive pinion 40, the motor 60, the output shaft 80, and the slide action switch 30. FIG. 6A shows the mechanism in the position where ring gear 50 and pinion gear 40 are engaged. FIG. 6B shows the operating position of slide switch 30 where ring gear 50 and pinion gear 40 are disengaged. As shown in the referenced figure, an optional gear assembly 70 is disposed between the motor 60 and the pinion 40. As will be understood, upon actuation of the motor 60, the output shaft 80 is rotated. The pinion 40 is thus rotated. The slide action switch 30 is selectively positionable between a first position A and a second position B. As will be understood, the switch 30 also includes a gripping member 34 and a carriage 36. A user urging the gripping member 34 to either position A or position B, also displaces the carriage 36 and the pinion 40 to that position. As previously noted, the pinion 40 is axially movable along the output shaft 80 by use of a key or other configuration.

Referring to FIGS. 3 and 6A, upon positioning the switch 30, the carriage 36, and the pinion 40 to position A, the pinion 40 is engaged with the ring gear 50. Thus, upon actuation of the motor 60, the ring gear 50 and the drum 10 are rotated about axis X. And, upon positioning the switch 30, the carriage 36, and the pinion 40 to position B, as shown in FIG. 6B the pinion 40 is disengaged from the ring gear 50. Thus, the drum 10 may be manually rotated about axis X. Therefore, position A corresponds to a powered mode of the fish tape tool 2, and position B corresponds to a manual mode of the fish tape tool 2. The present subject matter is not limited to the particular slide action switch 30. Generally, many embodiments include a drive selector positionable between a powered mode in which rotation of the output shaft of the electric motor results in rotation of the drum, and a manual mode in which rotation of the output shaft of the electric motor is independent from rotation of the drum. The previously described switch 30 and carriage 36, is an example of one type of a drive selector in accordance with the present subject matter. It will be understood that the present subject matter includes a wide array of the types of drive selectors. For instance, a mechanism which relies on rotation of the motor 60 to urge pinion 40 into mesh with ring gear 50 is an alternative configuration. This type of centrifugally activated mechanism is commonly known as a "Bendix drive" and is commonly used in internal combustion engine starters to engage gears only when a motor is rotating and disengage gears the motor is not energized.

Figure 7:
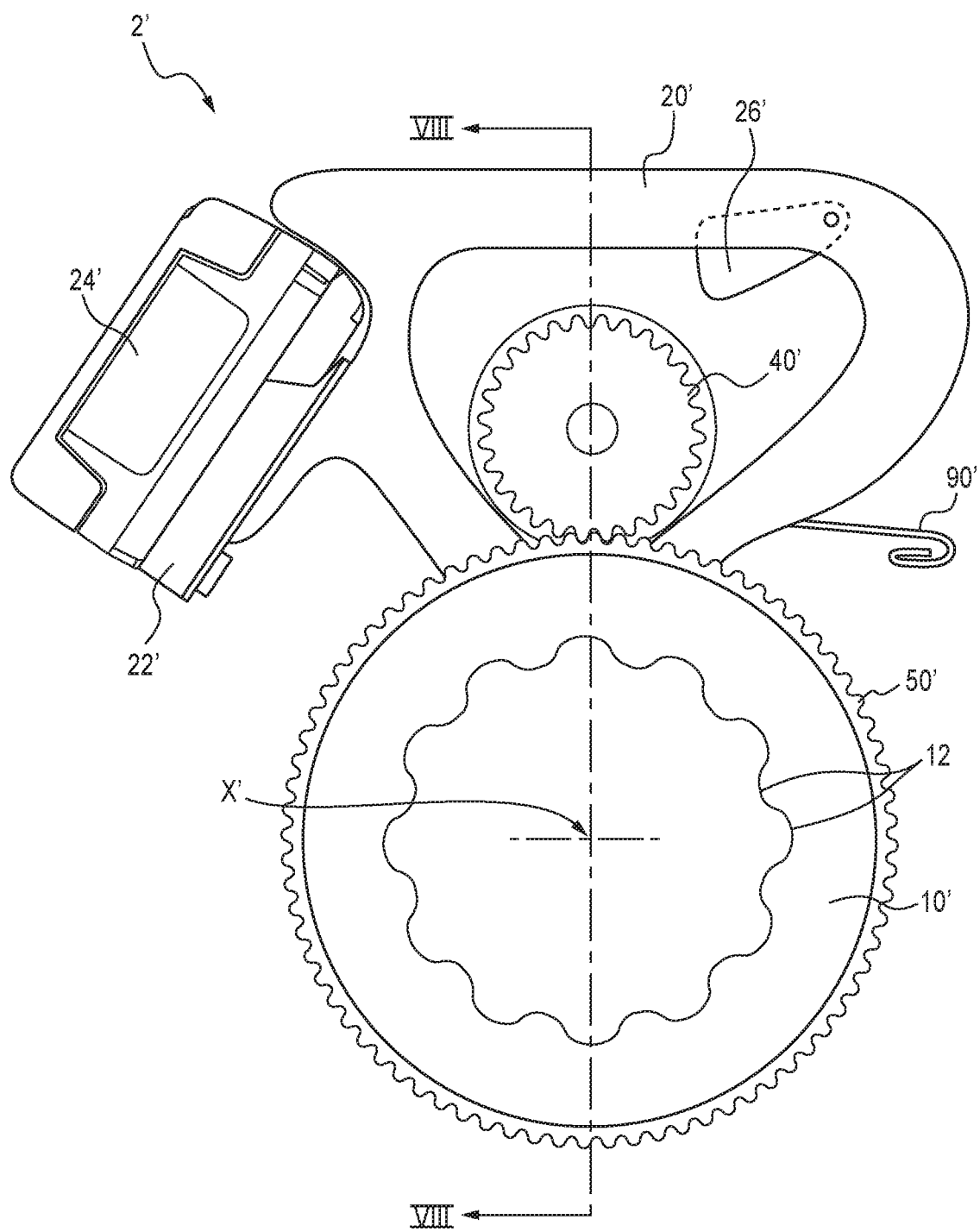
FIG. 7 is a schematic side elevational view of another embodiment of a fish tape in accordance with the present subject matter.
Figure 8:
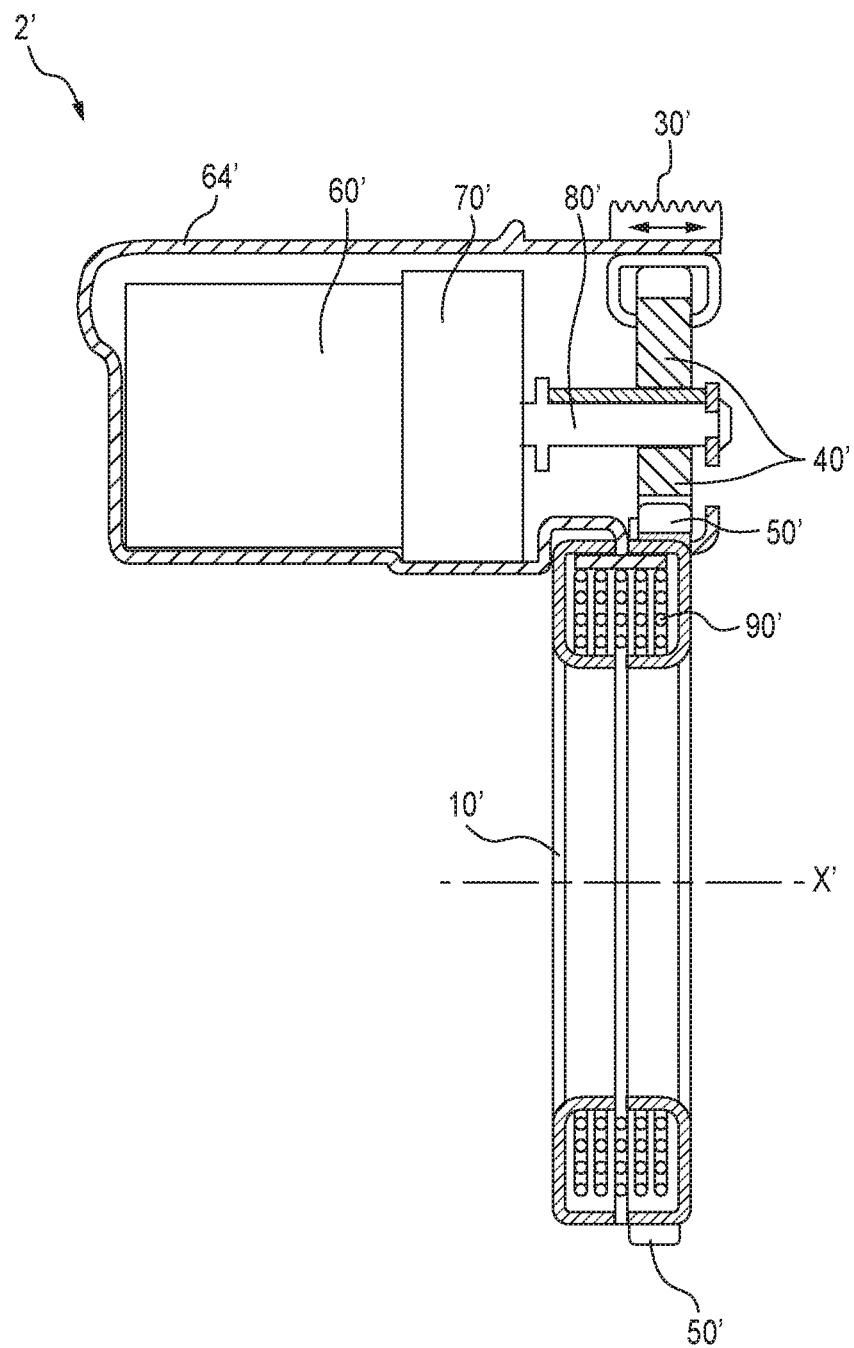
FIG. 8 is a sectional view taken along line VIII-VIII in FIG. 7.

FIGS. 7 and 8 illustrate another embodiment of a fish tape tool 2' in accordance with the present subject matter. In the description of this alternate embodiment, where applicable, the same reference numbers are utilized, but including a prime. In this version of the tool 2', a different configuration for the handle 20' and positioning of the drive pinion 40' are utilized. In addition, the drum 10' includes a plurality of gripping members 12 for promoting manual rotation of the drum 10' by an operator about a central axis X' when the tool is used in a manual mode. The gripping members 12 are typically provided along an outer face of the drum 10'. However, the present subject matter includes other locations and configurations for the gripping members 12.

The present subject matter also provides methods for pulling flexible members such as electrical conductor wires, through enclosed regions such as conduits or interior wall regions. The methods utilize the fish tapes of the present subject matter. Typically, such methods comprise providing a fish tape tool including a handle, and a drum defining a hollow interior region. The drum is supported by the handle and defines a central axis and is rotatable about the central axis. The fish tape tool also includes a ring gear affixed to the drum, and an electric motor supported by the handle. The electric motor provides a rotatable drive. The fish tape tool also includes a pinion gear assembly rotatably powered by the drive of the electric motor. The pinion gear is axially positionable between a first position in which the pinion gear is engaged with the ring gear, and a second position in which the pinion gear is disengaged from the ring gear. The methods also comprise extending the fish tape wire through the enclosed region. The methods further comprise attaching the flexible member to a distal end of the fish tape wire. And, the methods comprise retracting the fish tape wire through the enclosed region thereby pulling the flexible member through the enclosed region.

The methods of the present subject matter include operating the fish tapes in a powered mode exclusively, a manual mode exclusively, or in a mixed mode in which the fish tapes or operated in a powered mode and a manual mode. For example, the extending may be performed by positioning the pinion gear in the first position in which the pinion gear is engaged with the ring gear and actuating the electric motor. Similarly, the retracting may be performed by positioning the pinion gear in the first position in which the pinion gear is engaged with the ring gear and actuating the electric motor. Alternatively, the extending may be performed by positioning the pinion gear in the second position in which the pinion gear is disengaged from the ring gear, and manually rotating the drum. And, the retracting may be performed by positioning the pinion gear in the second position in which the pinion gear is disengaged from the ring gear, and manually rotating the drum.

The fish tape tools of the present subject matter may utilize one or more of the following aspects. A trigger assembly can be used to govern on/off operation of an electric motor incorporated within the fish tape, for powering advancement or retraction of the fish tape wire. A directional switch can be used to selectively and positionably advance the fish tape wire in one switch position and retract the fish tape wire in another switch position. A slide action switch or gear assembly enables manual operation if desired. While operation of the fish tapes is typically powered, in many embodiments an operator may utilize a manual mode to retract or advance the fish tape wire. The manual mode can also be used to move or position the fish tape wire manually for example by a small distance such as 0.25 inches or where slow and precise movement of the fish tape is desired.

The present subject matter includes numerous alternative configurations which utilize a motor that rotates the drum or similar component in a fish tape tool. These alternative configurations include provisions for a two-way motor rotation which would both extend and retract the fish tape wire from the drum under power. In addition, there are alternative configurations that could be utilized to engage and disengage the drive pinion and ring gear such as a toggle mechanism that would radially disengage the gears instead of axially disengaging the gears. The ring gear teeth could be molded into the drum housing instead of provided utilizing a separate component.

Another alternative drive could be utilized to position a ring gear on the drum inner diameter instead of the drum outer diameter. It would also be possible to use a friction drive such as a rubber-like wheel that would rely on friction against the drum to impart rotation instead of a cogged gear tooth design. It could also be possible to design a ring and pinion gear set which engage and disengage through radial movement of the pinion with respect to the gear in place of the axial motion previously described.

Although battery powered is preferred, it is also possible to use a corded type motor for continuous operation without the need to change or recharge batteries.

Another alternative configuration for the fish tapes is to use a worm type drive in which the output shaft from a motor gearbox is a worm gear that engages to a mating gear on the drum outer diameter. The worm gear and mating gear could disengage radially with a toggle-like mechanism.

The various embodiments of a battery powered fish tape reduce the manual effort in retracting the fish tape back into the drum. The fish tape embodiments also mechanize the process of pulling wire through conduits which can speed the process and reduce the manual exertion required to retract a fish tape. Battery powered tools are used in many places in construction industry and it is surprising that the current practice used on many of construction sites for small wire pulls is to pull the fish tape wire manually. It is believed that if an appropriate battery powered fish tape were provided, it would be well accepted by end users.

For versions of fish tapes utilizing planetary gear assemblies, disengagement provisions may be utilized to disengage planetary gear elements for purposes of manually dispensing or retracting the fish tape wire. This provides a distinct operational advantage over known control switch mechanisms. In particular, if the electromechanical components of known fish tapes fail, the fish tapes of the present subject matter remain operational.

The key advantages of the fish tapes of the present subject matter include but are not limited to reduced operator fatigue when pulling cable and improved speed. The use of a motorized device allow continuous movement of the drum/fish tape compared to the start-stop-start type of motion resulting from manual operation.

It is also contemplated that the slide switch component or assembly could be automated, powered, or otherwise displaced by a solenoid or cam component, such that the slide shifter only engages its corresponding gear when the trigger switch is pressed or otherwise actuated.

In certain versions of the present subject matter fish tapes, the rotatable drum, for example the drum 10 shown in FIG. 1, is free of one or more handles, knobs, or other gripping members. And in particular versions, such rotatable drums are also free of extraneous components and assemblies such as levers and/or latching mechanisms, retention clips for such levers or latches, and like components. Provision, incorporation and assembly of such handles, knobs or gripping members and particularly with extraneous components result in greater complexity, cost, and increased manufacturing time, all of which are undesirable.

Furthermore, in versions of the present subject matter fish tapes which feature a manual mode in which rotation of the drum is independent from rotation of an output shaft of the drive motor, significant operational benefits are realized. Enabling full disengagement between the drive motor and the drum enables a user to manually rotate the drum without any resistance load from the drive motor and associated transmission. This is significant particularly for long time periods of use of the fish tape and for applications in which the user manually feeds fish tape wire.

Although clutch assemblies are known in the prior art to decouple a rotatable component from a drive motor; clutch assemblies are complex, typically require maintenance, and increase costs of the resulting assembly. The versions of the fish tapes utilizing a drive selector such as the slide action switch 30 and associated components, enable selective engagement and disengagement between a pinion gear and a ring gear without the accompanying complexity, maintenance demands, and increased costs associated with clutch assemblies.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A fish tape tool comprising:
    a housing having a handle including a battery receptacle configured for receiving at least one battery;
    a rotatable drum, the rotatable drum defining a hollow interior region and an aperture providing access to the interior region of the rotatable drum;
    an electric motor disposed in the housing, the electric motor providing a rotatably powered output shaft;
    a drive assembly configured to transfer rotary power from the output shaft of the electric motor to the rotatable drum;
    a drive selector positionable between (i) a powered mode in which rotation of the output shaft of the electric motor results in rotation of the rotatable drum, and (ii) a manual mode in which rotation of the output shaft of the electric motor is independent from rotation of the rotatable drum;
    wherein the drive selector is movably mounted along the housing of the fish tape tool to enable an operator to selectively position the drive selector;
    wherein the drive assembly includes a pinion gear engageable with the output shaft of the electric motor and a ring gear affixed to the rotatable drum, and the ring gear includes gear teeth that extend radially outward.

2. The fish tape tool of claim 1 wherein the pinion gear is axially positionable relative to the output shaft of the electric motor.

3. The fish tape tool of claim 2 wherein the drive selector includes a slide action switch engaged with the pinion gear, such that displacement of the switch results in axial displacement of the pinion gear relative to the output shaft of the electric motor.

4. The fish tape tool of claim 1, the fish tape tool further comprising:
    the at least one battery disposed and engaged in the battery receptacle.

5. The fish tape tool of claim 1 further comprising:
    an actuation switch configured to govern on/off operation of the electric motor.

6. The fish tape tool of claim 5 wherein the actuation switch is also configured to govern rotational speed of the electric motor.

7. The fish tape tool of claim 1 further comprising:
    a direction switch configured to govern direction of rotation of the electric motor.

8. The fish tape tool of claim 1 further comprising:
    a gear assembly disposed between the output shaft of the electric motor and the drive assembly.

9. The fish tape tool of claim 8 wherein the gear assembly is a planetary gear assembly.

10. The fish tape tool of claim 1 further comprising:
    a fish tape wire at least partially disposed in the interior region of the rotatable drum.

11. A fish tape tool comprising:
    a handle;
    a drum defining a hollow interior region, the drum supported by the handle and defining a central axis and the drum rotatable about the central axis;
    a ring gear affixed to the drum;

an electric motor supported by the handle, the electric motor providing a rotatable drive;

a pinion gear assembly rotatably powered by the drive of the electric motor, the pinion gear assembly axially positionable between a first position in which the pinion gear assembly is engaged with the ring gear, and a second position in which the pinion gear assembly is disengaged from the ring gear;

a slide action switch engaged with the pinion gear assembly, wherein displacement of the slide action switch results in axial positioning of the pinion gear assembly between the first position and the second position, wherein the slide action switch is movably mounted along the handle of the fish tape tool to enable an operator to selectively position the pinion gear assembly;

wherein the ring gear includes gear teeth that extend radially outward.

12. The fish tape tool of claim 11 wherein the handle includes a battery receptacle.

13. The fish tape tool of claim 12, the fish tape tool further comprising:
a battery disposed and engaged in the battery receptacle.

14. The fish tape tool of claim 11 further comprising:
an actuation switch configured to govern on/off operation of the electric motor.

15. The fish tape tool of claim 14 wherein the actuation switch is also configured to govern rotational speed of the electric motor.

16. The fish tape tool of claim 11 further comprising:
a direction switch configured to govern direction of rotation of the electric motor.

17. The fish tape tool of claim 11 further comprising:
a gear assembly disposed between the rotatable drive of the electric motor and the pinion gear assembly.

18. The fish tape tool of claim 17 wherein the gear assembly is a planetary gear assembly.

19. The fish tape tool of claim 11 further comprising:
a fish tape wire at least partially disposed in the interior region of the drum.

20. A fish tape tool comprising:
a housing having a handle including a battery receptacle configured for receiving at least one battery;

a rotatable drum, the rotatable drum defining a hollow interior region and an aperture providing access to the interior region of the rotatable drum, the rotatable drum having an axis of rotation;

an electric motor disposed in the housing, the electric motor providing a rotatably powered output shaft;

a drive assembly configured to transfer rotary power from the output shaft of the electric motor to the rotatable drum;

a drive selector positionable between (i) a powered mode in which rotation of the output shaft of the electric motor results in rotation of the rotatable drum, and (ii) a manual mode in which rotation of the output shaft of the electric motor is independent from rotation of the rotatable drum;

wherein the drive selector is movable along an axis parallel to the axis of rotation of the rotatable drum and mounted along the housing of the fish tape tool to enable an operator to selectively position the drive selector.

21. A fish tape tool comprising:
a handle;

a drum defining a hollow interior region, the drum supported by the handle and defining a central axis and the drum rotatable about the central axis;

a ring gear affixed to the drum;

an electric motor supported by the handle, the electric motor providing a rotatable drive;

a pinion gear assembly rotatably powered by the drive of the electric motor, the pinion gear assembly axially positionable between a first position in which the pinion gear assembly is engaged with the ring gear, and a second position in which the pinion gear assembly is disengaged from the ring gear;

a slide action switch engaged with the pinion gear assembly, wherein displacement of the slide action switch results in axial positioning of the pinion gear assembly between the first position and the second position, wherein the slide action switch is movable along an axis parallel to the central axis of the drum and mounted along the handle of the fish tape tool to enable an operator to selectively position the pinion gear assembly.

* * * * *